June 15, 1937. E. S. CASCADDEN 2,084,055
BREAKING PLOW
Filed June 20, 1936
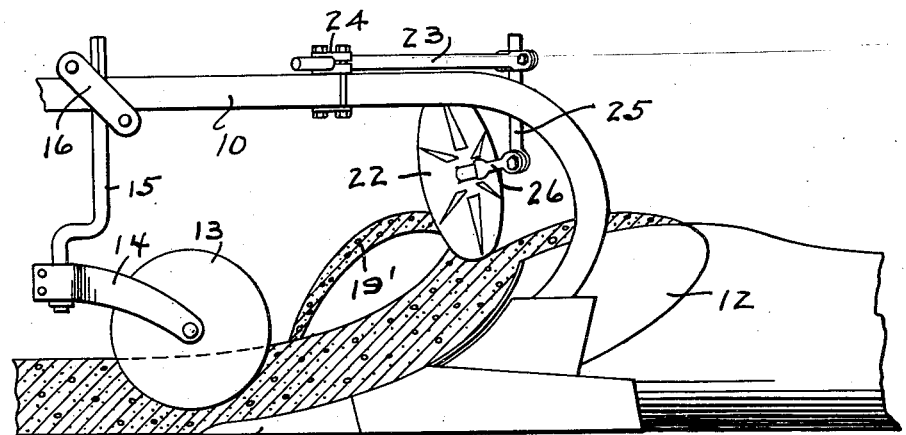
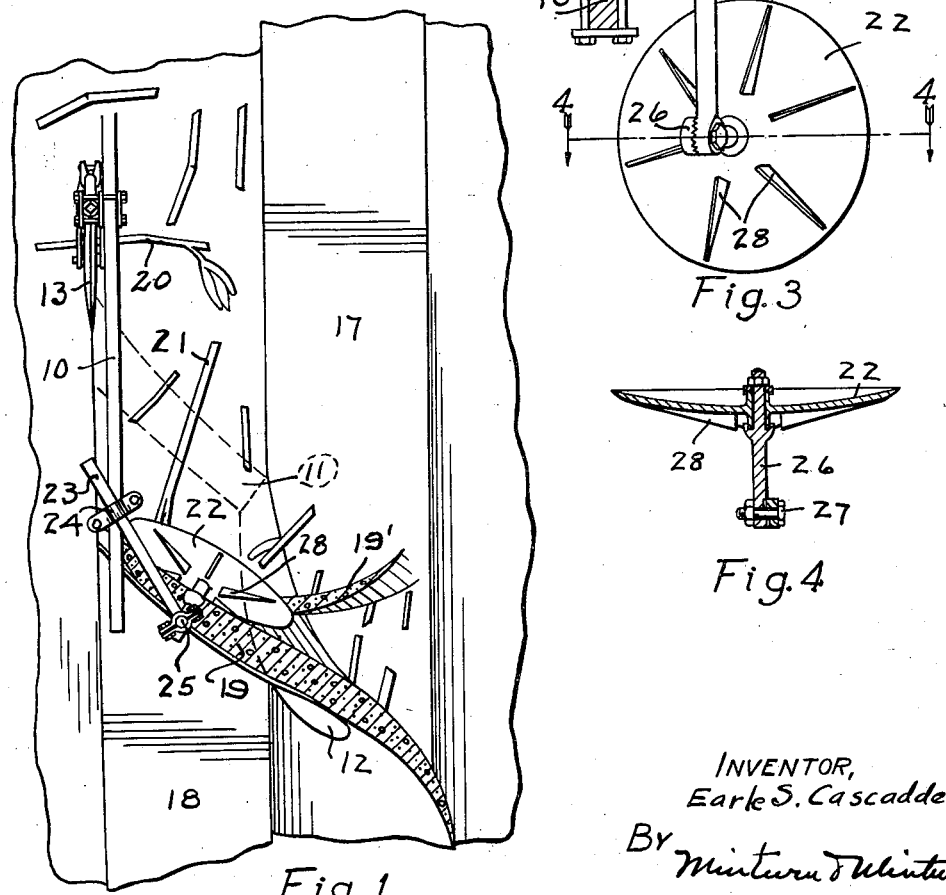
INVENTOR,
Earle S. Cascadden,
BY Minturn & Minturn,
ATTORNEYS Patented June 15, 1937

2,084,055

UNITED STATES PATENT OFFICE 2,084,055

BREAKING PLOW

Earle S. Cascadden, Lapel, Ind.

Application June 20, 1936, Serial No. 86,229

5 Claims. (Cl. 97—209)

This invention relates to an attachment for a breaking plow and has for its primary object the provision of means for completely covering corn stalks, stubble, and the like without having to initially prepare the ground in advance of the breaking plow. It has been an exceedingly great problem in the breaking of ground particularly that which has been in corn the preceding year, to completely cover the remaining corn stalks with the result that the usual procedure has been to either break the stalks and then disc them, break the stalks and burn them, or proceed with the breaking of the ground hoping to cover up the greater proportion of the stalks. In any event, the result has heretofore been that many of the corn stalks were thrown out onto the plowed ground and left uncovered presenting a difficult problem in the further cultivation of the ground. Moreover with the advent of the corn borer problem, it has become important to completely cover the old stalks and to do so effectively so that several inches of dirt at least will cover the stalks.

The invention is to be distinguished from the customary rolling colter and jointer. In fact the rolling colter is desirable to be used in conjunction with my invention and the jointer may or may not be employed as the operator may desire.

A further important object of the invention is to provide such an attachment as above indicated which may be quickly and readily adjusted to the required operating position with a minimum of effort and expenditure of time, and furthermore to provide such an attachment at a relatively low price so it may be employed without adding materially to the cost of the plow.

These and other objects and advantages will become apparent to those versed in the art in the following description of one particular form of the invention as illustrated more or less diagrammatically in the accompanying drawing, in which Fig. 1 is a fragmentary top plan view of a breaking plow to which the invention is applied;

Fig. 2, a side elevation;

Fig. 3, a rear elevation of the turning disc; and

Fig. 4, a transverse horizontal section on the line 4—4 in Fig. 3.

Like characters of reference indicate like parts throughout the several views in the drawing.

A typical plow is herein shown as having the beam 10 with the share 11 and moldboard 12. The customary rolling colter 13 is mounted in caster fashion through the bracket 14 and the stem 15 which is attached to the beam 10 by the mounting bracket 16. The plow herein shown is right hand and the colter 13 defines the left side of the furrow.

Referring to Fig. 1, a furrow 17 is indicated as having been formed and the plow is cutting the furrow 18 and turning the dirt 19 over therefrom into the furrow 17. Ordinarily the colter 13 will cut through stalks lying at an angle across its path such as the stalk 20, but such stalks as 21 lying longitudinally of the land being turned remain unaffected but generally flip over to project beyond the furrow 17. Moreover all of the cut stalks do not normally fall into the furrow 17 completely but lean up on the land to the right of the furrow.

In order to overcome this difficulty, I mount a concave disc 22 forwardly of the moldboard 12 in a particular manner as will hereinafter be described. The disc may be mounted in any one of many ways, depending somewhat upon the room adjacent the beam and the moldboard, the particular form herein shown and described being one particular example. On the beam 10 is adjustably mounted a shaft 23 by an adjustable bracket 24 so that the shaft 23 may be rotatably as well as longitudinally adjustable in relation to the beam. The shaft 23 extends rearwardly and to the right of the beam and adjustably carries by its rear end a downturned shaft 25 adjustable both rotatably as well as longitudinally. Adjustably secured to the lower end of the shaft 25 is an axle shaft 26 on which the disc 22 is revolubly carried. In the particular form herein shown, the axle shaft 26 is secured to the shaft 25 by the well known means of radial teeth on the shaft 25 engaging between like teeth on the end of the shaft 26 and there held by means of a through-bolt 27.

These various adjustments above indicated are particularly required in order to mount the disc 22 in the most favorable operating position. The lower portion of the disc below the axle shaft 26 is mounted to be in substantial parallelism with the upper portion of the moldboard 12. The disc 22 must be so adjusted as to its position that when the soil 19 coming up out of the furrow 18 comes around the moldboard 12, the disc 22 will shave off from the entire upper surface of that soil a layer ordinarily about two or three inches thick, depending upon the nature of the soil and its covering.

In other words, the standard plowshare 11 and moldboard 12 in combination with the rolling colter 13 cut the furrow 18 and turn the soil therefrom over and up-side-down into the adjacent furrow 17 in the customary manner with the exception that the top side of the soil 19 coming from the furrow 18 in being shaved off is thrown around forwardly into the furrow 17 ahead of the principal mass of soil 19 dropping thereover under the forward movement of the plow. As indicated by the drawing, the disc 22 is normally set above the level of the land being plowed and confined entirely to the right of the bank of the furrow in which the plow is operating (a right hand plow being considered). Also it is to be noted that the top portion of the disc 22 is inclined forwardly rather than rearwardly as is the case when a disc is employed for plowing purposes. The forward motion of the plow causes the soil 19 to move regularly therepast as it turns over and this motion causes the disc 22 to revolve upon contact with this moving soil. To insure rotation of the disc so as to prevent clogging, cleats 28 may be added to the rear side thereof so as to be engaged in the main portion of the soil 19. When the cut portions of stalks 20 and uncut stalks 21 are encountered as the plow advances, these portions will be turned by the disc 22 and thrown over into the furrow 17 most effectively and there held by the slice of soil 19' shaved off from the furrow slice by the disc. Not only does this advance portion 19' serve to push the stalk pieces down into the furrow 17 and there retain them, but it also provides a finely broken up mass of soil in the bottom of the furrow which greatly aids in getting the soil in the proper condition for planting and cultivation, avoiding air pockets. The diameter of the disc 22 should approximate the width of the furrow being turned, a slightly less diameter being permissible. In any event it is to be noted that the major portion of the disc is above the top of the moldboard 12 and since the disc is inclined forwardly by its upper portion, any trash coming up on the soil being lifted by the moldboard can not shoot over the top of the moldboard for the reason that the disc will deflect it downwardly and toward the furrow 17. The adjustment of the position of the disc 22 is critical as to its cutting depth, its angle, and the thickness of the slice it shaves off of the furrow being turned. In sod, for example, the thickness of this portion being turned ahead of the main mass of soil 19 will be in the neighborhood of three inches, being somewhat greater than where stubble or stalk land is being plowed. Moreover the angle of the disc 22 must be made such as to deflect the trash and upper soil shaved off of the main furrow soil within the furrow 17 and not up onto the far side thereof.

From the foregoing description it is to be seen that I have provided a most effective attachment for a breaking plow to overcome one of the most difficult problems encountered in breaking.

While I have shown and described my invention in the form as now best known to me, it is obvious that structural variations may be had without departing from the spirit of the invention and I, therefore, do not desire to be limited to that precise form beyond the limitations as may be imposed by the following claims.

I claim:

1. In combination with the moldboard of a plow designed to turn over a furrow, a concave disc having a diameter equal to approximately the furrow width, and means carried by the plow for revolubly mounting the disc ahead of the moldboard but rearwardly of the plow point, said disc being positioned to have its concave side turned forwardly and its upper edge leaned ahead of its lower edge and extending above the top of the moldboard, the lower edge of the disc being spaced ahead of the moldboard only a sufficient distance to shave off the forward side of the furrow while it is turning up over and transversely across the front of the moldboard and being substantially parallel to the portion of the moldboard horizontally therebehind, the horizontal and vertical angularity of the disc being adjusted through said means to deflect all matter on said forward side of the furrow ahead of and downwardly within the path of the overturning furrow so as to be completely covered over thereby.

2. In combination with a moldboard of a plow, for turning a normal furrow, a disc plow for cutting away a part of the forward side of said furrow after it is initially started up by said moldboard, said disc plow comprising a disc and means for carrying the disc transversely across and in spaced relation ahead of said moldboard to cut away said side while said furrow is turning up on edge, said means being adjusted to position said disc to cause it to throw said forward side to one side of said moldboard into the path of said furrow as it overturns under the influence of said moldboard, and furrow engaging members on the rear side of said disc to insure positive rotation thereof through movement of the furrow therebehind.

3. In combination with a moldboard of a plow, for turning a normal furrow, a disc plow for cutting away a part of the forward side of said furrow after it is initially started up by said moldboard, said disc plow comprising a disc and means for carrying the disc transversely across and in spaced relation ahead of said moldboard to cut away said side while said furrow is turning up on edge, said means being adjusted to position said disc to cause it to throw said forward side to one side of said moldboard into the path of said furrow as it overturns under the influence of said moldboard, and a rolling colter cutting the furrow from the land to present a smooth furrow edge to said disc.

4. For breaking trashy ground, the combination with a plow of a moldboard for turning a furrow, a colter or jointer for defining a furrow bank, and an auxiliary concave disc plow member carried by the plow across, ahead of and principally above said moldboard in rough parallelism with the central upper portion thereof, the disc having a diameter substantially equal to the furrow width, and the top edge of the disc being ahead of its bottom edge.

5. For breaking trashy ground, the combination with a plow of a moldboard for turning a furrow, a colter or jointer for defining a furrow bank, and an auxiliary plow member carried by the plow across, ahead of and principally above said moldboard in rough parallelism with the central upper portion thereof, said member being a forwardly concave disc, and projecting members on the rear side of the disc.

EARLE S. CASCADDEN.